United States Patent [19]

Gow

[11] 3,911,228

[45] Oct. 7, 1975

[54] INTERCOMMUNICATION AND SECURITY SYSTEM

[76] Inventor: George G. Gow, 5163 Red Oak Drive, St. Paul, Minn. 55112

[22] Filed: Apr. 1, 1974

[21] Appl. No.: 457,051

[52] U.S. Cl. .................................. 179/37; 179/2 A

[51] Int. Cl. .......................................... H04m 5/00

[58] Field of Search ......... 179/2 A, 37, 38, 1 H, 39, 179/40, 17 B, 84 SS, 16 A, 16 AA; 317/112, 139, 140; 340/157, 147 LP

[56] References Cited

UNITED STATES PATENTS

| | | | |
|---|---|---|---|
| 3,532,820 | 10/1970 | Holm | 179/37 |
| 3,740,487 | 6/1973 | Ter Veen | 179/2 A |

*Primary Examiner*—Thomas A. Robinson
*Attorney, Agent, or Firm*—Neil B. Schulte

[57] ABSTRACT

An apartment building intercommunication security system is disclosed using a dial switch like that of a telephone which produces a series of electrical pulses representative of the digits 1 through 9 for selecting the appropriate apartment within an apartment complex. The dial switch is connected to a selector stepping switch so that the electrical pulses representative of the digits zero through 9 are passed through the switch in successive order and the switch arm is advanced to the next contact after receiving the last of each of the series of pulses. Another stepping switch is connected to the selector stepping switch and a second stepping switch is connected to the first stepping switch, both switches having a switch arm responding to a series of pulses from the dial switch. A third stepping switch is connected to the first stepping switch and also includes a switch arm responsive to a third series of pulses. A central intercommunications mechanism is located in the entrance or vestibule of the apartment complex and is connected to the first stepping switch and an apartment unit located in a plurality of remote locations. Each of the remote intercommunications units are connected to the second and third stepping switch so that the dial system uses only two wires to connect the system to each apartment. Additionally, the main dial system may be located in two or more vestibules or entrances and is so connected to disable the other units in the other entries when the first is actuated.

10 Claims, 9 Drawing Figures

INTERCOMMUNICATION AND SECURITY SYSTEM

This invention relates to the field of communications and more particularly to an intercommunication and door release or latching system.

In the past numerous ways have been devised for communicating between the vestibule or entrance of an apartment building and the various apartments. One of the disadvantages of a number of the systems is that numerous conductors are required to carry out all of the signaling and security features between the apartment units and the entrance or vestibule. Another disadvantage with some of the systems presently in use is that there is a certain amount of "eavesdropping" that may take place when certain apartments on the same line are connected with an entrance unit.

The disadvantages are multiplied when more than one entry is used in a single building where the cost of wire, and equipment, plus the labor expense in installing the system merely multiplies with the number of entrances.

One attempt to solve the particular problems outlined above is found in U.S. Pat. No. 3,532,820 to Holm in a patent disclosure entitled "Selective Intercom Systems For Apartment Building Door Answering and the Like". However, as disclosed in the Holm disclosure, the eavesdropping situation will either take place or is corrected through the use of a third wire and a number of additional components which act as diodes to block the cross-talk between apartment units. It is also obvious from this disclosure that a third conductor is required and thus the disadvantage of extra cost and installation is involved.

The present invention discloses an intercommunication system and door opener which makes use of two conductors for each apartment instead of the larger number of conductors being used presently. Through the use of a dial switch, a number of push buttons are eliminated, thus taking up less space on the entrance console and generally additional apartments may be added without changing the present switching capacity which will permit communicating with some 399 apartments. Present disclosure also requires no extra conductor for signaling the occupant of the apartment as the signaling takes place automatically. It has also been found that it becomes less complicated through the use of a single push button switch for operation of the amplifier communication system. The system is also designed to return to its normal or home condition upon waiting a predetermined period of time without response by the apartment operator or upon the actuation of the door latch system. Present system is extremely economical when two or more entries are to be used because it does not require a doubling of a push button system and has the added feature of locking out or disabling other entrances when a particular entrance is being used.

It is therefore a general object of the present invention to provide a circuit using selector stepping switches to eliminate excessive wiring in an apartment intercommunication and door latch system.

It is another object of this invention to provide an intercommunication system in which eavesdropping is eliminated.

A further object of the present invention is to provide an intercommunication system using only a pair of conductors to each apartment.

A further object of this invention is to provide an intercommunication system in which an apartment may be called from a plurality of locations and all but the calling station is disabled.

It is a more specific object of this invention to automatically return the intercommunication system to normal use after a predetermined delay without any answer. It is yet another object of this invention to automatically return the intercommunication system to normal use immediately after communicating with a remote apartment.

These and other objects and advantages of the invention will more fully appear from the following description, made in connection with the accompanying drawings, wherein like reference characters refer to the same or similar parts throughout the several views, and in which:

FIGS. 1*a* and 1*b* are electrical schematic diagrams of the invention showing a typical installation;

Figure 1A:
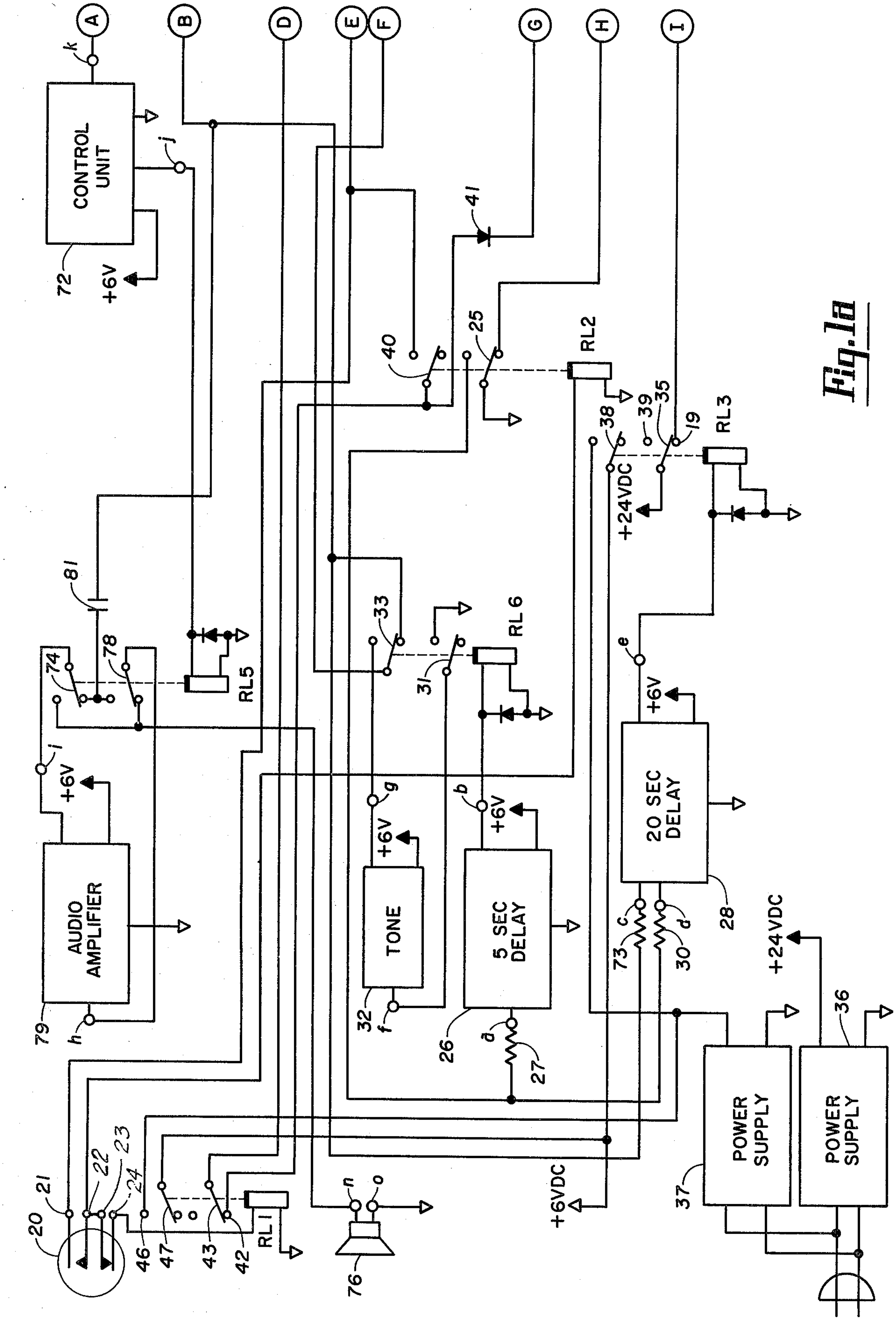
Figure 1B:
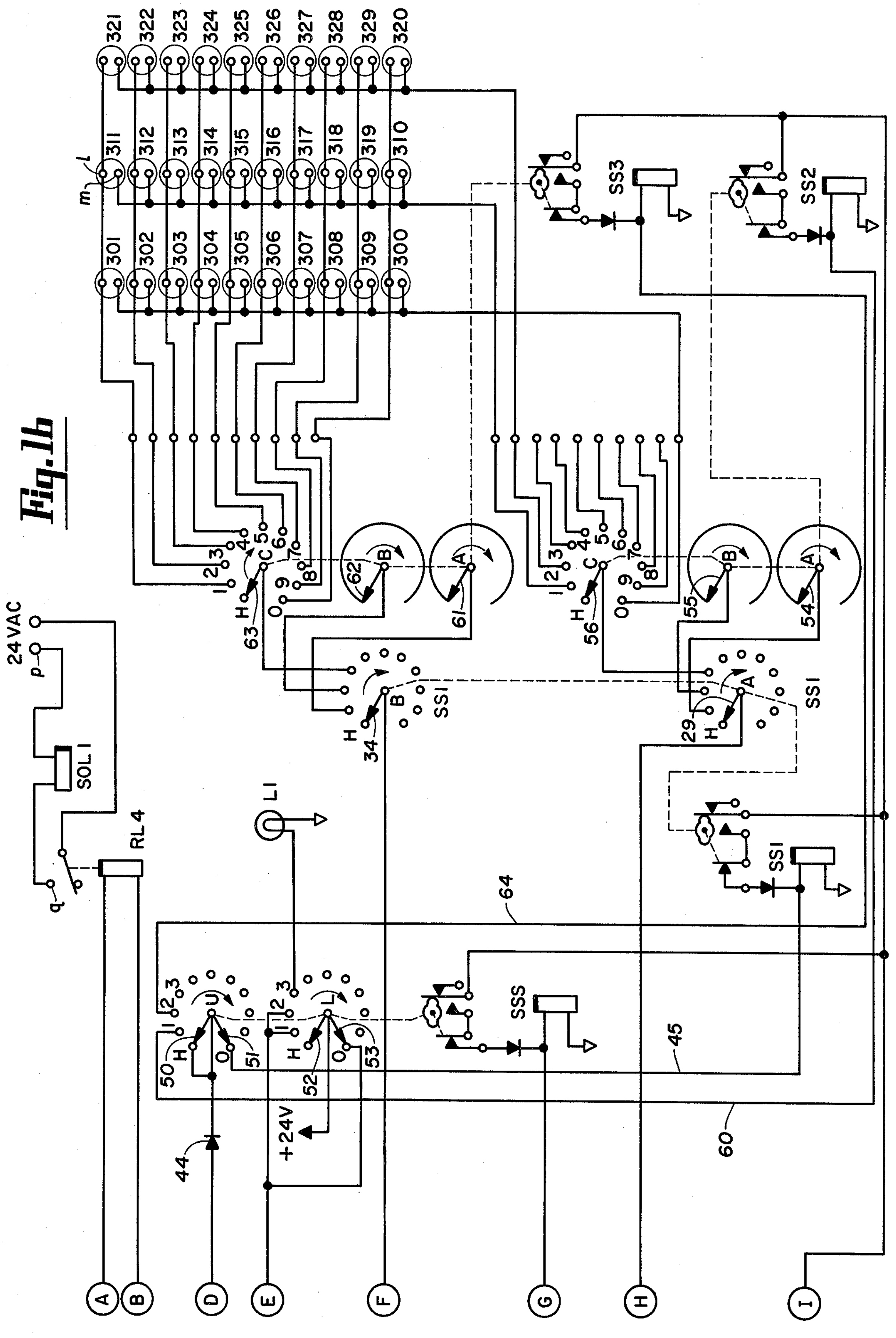

Turning now to FIGS. 1*a* and 1*b*, it will be observed that 24 volts direct current (dc) is applied to the center contact of a lower switch section (L) of selector stepping switch (SSS) which has a double contact arm applying the 24 volts through line E to a first contact 21 of a pulsing dial switch 20. Dial switch 20 is identical to the dial switch commonly found on all telephones employing a dial in which a pair of center contacts 22 and 23 are alternately pulsed against contact 21 and another contact 24. Contacts 22 and 23 are connected in the circuit as shown in FIG. 1*a* and contact 24 is connected to a coil of a relay RL1, and contact 22 is connected to a coil of a relay RL2. Assuming that it is desirable to communicate with an apartment in the complex, a specific example will be used to demonstrate the operation of the circuit and the different features of the invention. With the circuit as shown in FIGS. 1*a* and 1*b*, it is possible to select any one of a number of rooms designated 100 to 399 and an arbitrary example will be used in which room number 311 is chosen to receive a communication from an entrance or vestibule unit.

DIAL "3" OR ROOM NO. 311

Initially dial 20 is at the stop position and there is voltage applied to contact 21. Once the dial is moved to the "3" position, 24 volts is applied from the lower section of switch SSS to dial 20, and then to relay RL2 which is energized until dial 20 returns to the stop position. With relay RL2 energized, a relay contact arm 25 removes ground from line H and a switch arm 29 of switch section A of stepping switch SS1. Relay contact arm 25 applies ground to a five second delay circuit 26 through a resistor 27 and applies ground to a 20 second delay circuit 28 through a resistor 30. Upon 5 second delay circuit 26 becoming energized, relay RL6 is energized which applies a ground through relay arm 31 to a tone circuit 32. The output of the tone circuit passes through another contact arm 33 of relay RL6 and is applied to a contact arm 34 of switch section B of stepping switch SS1, the switch still being in the position shown in the circuit and thus the circuit is broken at that point.

The 20 second delay circuit 28 energizes relay RL3 which removes the 24 volt DC voltage from conductor I by a contact arm 35 of relay RL3. Thus the 24 volt pulsating DC signal is removed from "home contacts" of switches SSS, SS1, SS2, and SS3. A pair of power supplies 36 and 37 respectively supply voltages of plus 24 volts dc and plus 6 volts dc from a standard alternating current source of 110 volts. Another contact arm 38 of relay RL3 closes the circuit from the 6 volt power supply and applies it to the appropriate points so labeled in the circuit, until RL3 is de-energized and the 20 second delay expires.

With relay RL2 energized, 24 volts is applied from section L of switch SSS through contact "0" and conductor E through a contact arm 40 of relay RL2 to the coil of stepping selector switch SSS through a diode 41 and conductor G. Upon energizing the coil of switch SSS, the relay mechanism is electrically armed and mechanically held in position. For a more detailed description of the stepping switches such as switches SSS, SS1, SS2 and SS3, reference may be had to a catalog and equipment produced by C P Clare and Company of Chicago, Illinois, with particular reference to relay type 211 which includes a circuit generally referred to homing through Off-Normal contacts. Such switches are described in a standard catalog of July, 1972, No. 601 of stepping switches by Clare. It will also be observed that 24 volts is applied from line E through contact arm 40 to a contact 42 of relay RL1. In further explanation of the operation of dial 20, contacts 21, 22, 23 and 24 are closed upon moving the dial from its "stop" position. Thus contact 42 of relay RL1 simultaneously removes 24 volts from a contact arm 43, which was applied by relay arm 40 of relay RL2.

Upon dial 20 being released from the "3" position, relay RL1 is de-energized and 24 volts is temporarily applied through line D and a diode 44 to the double contacts of stepping switch SSS, and the coil of stepping switch SS1 is energized through a conductor 45. Coil SS1 electrically arms the stepping switch and mechanically holds the switch in that position. After the first pulse and before the second pulse, voltage is applied through contacts 23 and 24 to energize the coil of relay RL1. Contacts 42 and 43 are opened and the power is removed from the coil of stepping switch SS1 advancing switch contacts 29 and 34 from the home position H to a first position clockwise. Upon dialing the first digit, number "3", a pair of contacts 46 and 47 of relay RL1 are closed before the 20 second delay circuit can energize relay RL3 thus removing the home voltage from the contact 19 and contacting arm 38 remains closed until relay RL3 is de-energized. Upon contacts 23 and 24 breaking, relay coil RL1 is again de-energized and voltage is again applied to the latching coil of switch SS1 through line D, again arming and mechanically latching it. Upon the dial completing all the impulses for a "3", the coil of stepping switch SS1 is energized and de-energized to advance the contact arms 29 and 34 to the third set of contacts for a "3". The "3" represents the third floor of the apartment complex.

Once the dial is at the stop position, relay RL2 is de-energized, relay RL1 is de-energized, thus removing the voltage to the coil of selector stepping switch SSS. Selector stepping switch SSS has upper and lower switch section designated respectively as "U" and "L". Switch section U has a pair of rotatable switch arms 50 and 51 and section "L" has a pair of rotatable switch arms 52 and 53. Each of the switch contacts 50, 51, 52, and 53 are advanced to the next position rotating in a clockwise direction upon removing the voltage to the coil of the selector stepping switch SSS. Upon relay RL2 being de-energized, switch arms 25 and 40 are returned to their normally open position which opens the circuit to the 5 second delay circuit 26 and the 20 second delay circuit 28. Additionally, relays RL3 and RL6 remain energized until their delay periods have expired, but the next dialing sequence will normally precede these delay periods.

DIAL THE FIRST "1" OF ROOM NO. 311

With dial 20 at the stop position, there is voltage applied to contact 21. Once the dial is moved to the "1" position, 24 volts is applied from the lower section "L" of switch SSS to dial 20 through line E, and then to relay RL2 which is energized until dial 20 returns to the stop position. With relay RL2 energized, relay contact arm 25 removes ground from line H and switch arm 29 of switch section A of stepping switch SS1. Relay contact arm 25 applies ground to five second delay circuit 26 through resistor 27 and applies ground to 20 second delay circuit 28 through resistor 30. On dialing the second digit, the ground connection from contact arm 25 to the 20 second delay circuit captures any lost time used in dialing the first digit thus extending the delay time to the full 20 second period and for each digit thereafter. If all three digits are not dialed, the system returns to the normal condition. Because relay RL6 is still energized, tone circuit 32 is grounded through relay arm 31. The output of the tone circuit passes through contact arm 33 of relay RL6 and is applied to contact arm 34 of switch section B of stepping switch SS1, the switch still being in the third position shown in the circuit.

Stepping switch SS2 has three switch arms 54, 55 and 56 rotatably connected to sections A, B and C respectively, all of which are still at the home position (H) thus opening the circuit. It will be understood that section A and B are connected in the same manner as section C for floors on the "100" and "200" designated level.

With relay RL2 energized, 24 volts is applied from section L of switch SSS through contact "1" and conductor E through contact arm 40 of relay RL2 to the coil of stepping selector switch SSS through diode 41 and conductor G. Upon energizing the coil of switch SSS, the relay mechanism is electrically armed and mechanically held in position. It will also be observed that 24 volts is applied from line E through contact arm 40 to contact arm 42 of relay RL1. As explained earlier, contacts 21, 22, 23 and 24 remain closed upon moving the dial from its "stop" position. Thus contact 42 of relay RL1 simultaneously removes 24 volts from contact arm 43, which was applied by relay arm 40 of relay RL2.

Upon dial 20 being released from the "1" position, relay RL1 is de-energized and 24 volts is temporarily applied through line D and diode 44 to the double contact of stepping switch SSS and the coil of stepping switch SS2 is energized through a conductor 60. Coil SS2 electrically arms the stepping switch and mechanically holds the switch in that position.

After the first pulse, voltage is applied through contacts 23 and 24 to energize the coil of relay RL1. Contacts 42 and 43 are opened and the power is removed from the coil of stepping switch SS2 advancing switch contacts 54, 55 and 56 from the home position H to a first position clockwise, designated "1". The dial is once again at the stop position, relay RL2 is de-energized, relay RL1 is de-energized, thus removing the voltage to the coil of selector stepping switch SSS.

Each of the switch contacts 50, 51, 52, and 53 are advanced to the next position (2) rotating in a clockwise direction upon removing the voltage to the coil of the selector stepping switch SSS. Upon relay RL2 being de-energized, switch arms 25 and 40 are returned to their normally open position which opens the circuit to the 5 second delay circuit 26 and the 20 second delay circuit 28. Additionally, relays RL3 and RL6 remain energized until their delay periods have expired, but the next dialing sequence will normally precede these delay periods.

DIAL THE SECOND "1" OF ROOM NO. 311

With dial 20 at the stop position, there is voltage applied to contact 21. Once the dial is moved to the "1" position, 24 volts is applied from the lower section "L" of switch SSS to dial 20 through line E, and then to relay RL2 which is energized until dial 20 returns to the stop position. With relay RL2 energized, relay contact arm 25 removes ground from line H and switch arm 29 of switch section A of stepping switch SS1. Relay contact arm 25 applies ground to five second delay circuit 26 through resistor 27 and applies ground to 20 second delay circuit 28 through resistor 30. Because relay RL6 is still energized, tone circuit 32 is grounded through relay arm 31. The output of the tone circuit passes through contact arm 33 of relay RL6 and is applied to contact arm 34 of switch section B of stepping switch SS1, the switch still being in a third position shown in the circuit.

Stepping switch SS3 has three switch arms 61, 62, and 63 rotatably connected to sections A, B, and C respectively, all of which are still at the home position (H), thus opening the circuit. It will be understood that sections A and B are connected in the same manner as section C for floors on the "100" and "200+ designated level.

With relay RL2 energized, 24 volts is applied from section L of switch SSS through contact "2" and conductor E through contact arm 40 of relay RL2 to the coil of stepping selector switch SSS through diode 41 and conductor G. Upon energizing the coil of switch SSS, the relay mechanism is electrically armed and mechanically held in position. It will be observed that 24 volts is applied from line E through contact arm 40 to contact 42 of relay RL1. As explained earlier, contacts 21, 22, 23 and 24 remain closed upon moving the dial from its "stop" position. Thus contact 42 of relay RL1 simultaneously removes 24 volts from contact arm 43, which was applied by relay arm 40 of relay RL2.

Upon dial 20 being released from the "1" position, relay RL1 is de-energized and 24 volts is temporarily applied through line D and diode 44 to the double contact of stepping switch SSS and the coil of stepping switch SS3 is energized through a conductor 64. Coil SS3 electrically arms the stepping switch and mechanically holds the switch in that position.

After the first pulse, voltage is applied through contact 23 and 24 to energize the coil of relay RL1. Contacts 42 and 43 are opened and the power is removed from the coil of stepping switch SS3 advancing switch contacts 61, 62, and 63 from the home position H to a first position clockwise, designated "1". The dial is once again at the stop position, relay RL2 is de-energized, relay RL1 is de-energized, thus removing the voltage to the coil of selector stepping switch SSS.

Each of the switch contacts 50, 51, 52 and 53 are advanced to the next position (3) rotating in a clockwise direction upon removing the voltage to the coil of the selector stepping switch SSS. Upon relay RL2 being de-energized, switch arms 25 and 40 are returned to their normally open position which opens the circuit to the 5 second delay circuit 26 and the 20 second delay circuit 28. Additionally, relays RL3 and RL6 remain energized until their respective delay periods of 20 and 5 seconds have expired, but the calling sequence will normally precede these delay periods. After switch arm 52 reaches the third position of selector stepping switch SSS, a lamp L1 is energized indicating to the operator that the call may now be completed to the apartment.

INTERCOMMUNICATION CALLING

Figure 4:
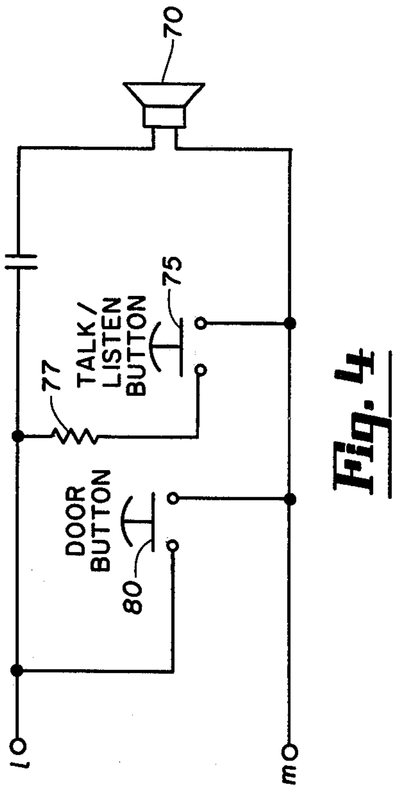
FIG. 4 is a schematic diagram of an apartment intercommunications and switching unit.

With relay RL6 still energized, an audio signal is generated in tone circuit 32 and applied to a speaker 70 (FIG. 4) through an electrical connector designated No. 311 (FIG. 1*b*) thus informing the occupants that someone is at the entrance. At the end of the 5 second delay, the tone is interrupted by de-energizing relay RL6, and the relay movable arm 33 and normally open contacts, connect the coil of door latch relay RL4 to a control circuit 72 which is shown in more detail in FIG. 8. Connected in parallel with the coil of relay RL4, is another circuit to 20 second delay circuit 28 through a resistor 73 to the audio circuit and a movable contact arm 74 of relay RL5. A push button switch 75 (FIG. 4) may then be actuated or pushed in apartment 311 to communicate with another speaker 76 in the entrance unit.

Upon closing the TALK switch 75, power is applied to relay RL5, thus actuating a reversing circuit through contact arms 74 and another contact arm 78 permitting an audio amplifier circuit 79 to drive the entrance microphone 76 as a speaker. Upon release of switch 75, the party at the entrance may speak to the party in apartment No. 311. The TALK switch 75 is in series with a voltage dropping resistor 77 to avoid energizing the door latch relay RL4 of control circuit 72 by keeping the voltage across the resistor at a level to lower the pull in voltage available to relay RL4. In other words, relay RL4 is not actuated when the Talk switch 75 is depressed.

OPENING THE DOOR

A door switch 80 (FIG. 4) applies a short circuit across the connector designated No. 311 in FIG. 1*b* and thus applies a ground circuit through conductors H, switch arms 29, 56, 63, and 34, through conductor F, through relay contact arm 33 and resistor 73 to the 20 second delay circuit 28 to keep relay RL3 energized for at least another 20 seconds. A coupling capacitor 81 is also connected to relay contact arm 33 and the coil of relay RL4 is at ground potential on line B. Both relays RL4 and RL5 are thus energized by the door switch 80. With relay RL4 closed, a door latch solenoid SOL 1 is energized and the door is opened from the apartment which was dialed.

Upon releasing door switch 80, relays RL4 and RL5 will be de-energized, which in turn de-energizes solenoid SOL1 and removes the ground connection to the 20 second delay circuit 28, causing relay RL3 to be de-energized.

HOMING CIRCUITS ENERGIZED

Upon relay RL3 being de-energized, the 24 volts is applied to the normally closed contact through contact arm 35 and to each of the "off-normal" sections of stepping switches SSS, SS1, SS2, and SS3 through conductor I. As each switch makes and breaks the circuit, the switch contact arms are stepping clockwise around the switch until the contacts react the home position as shown in the schematics. This action is accomplished by having the circuit broken for each step made by the switch arm until it reaches the "home" position as shown. Lamp L1 is also turned off, thus indicating the system is now ready for re-dialing.

OPERATION OF TWO OR MORE ENTRY UNITS

Figure 2:
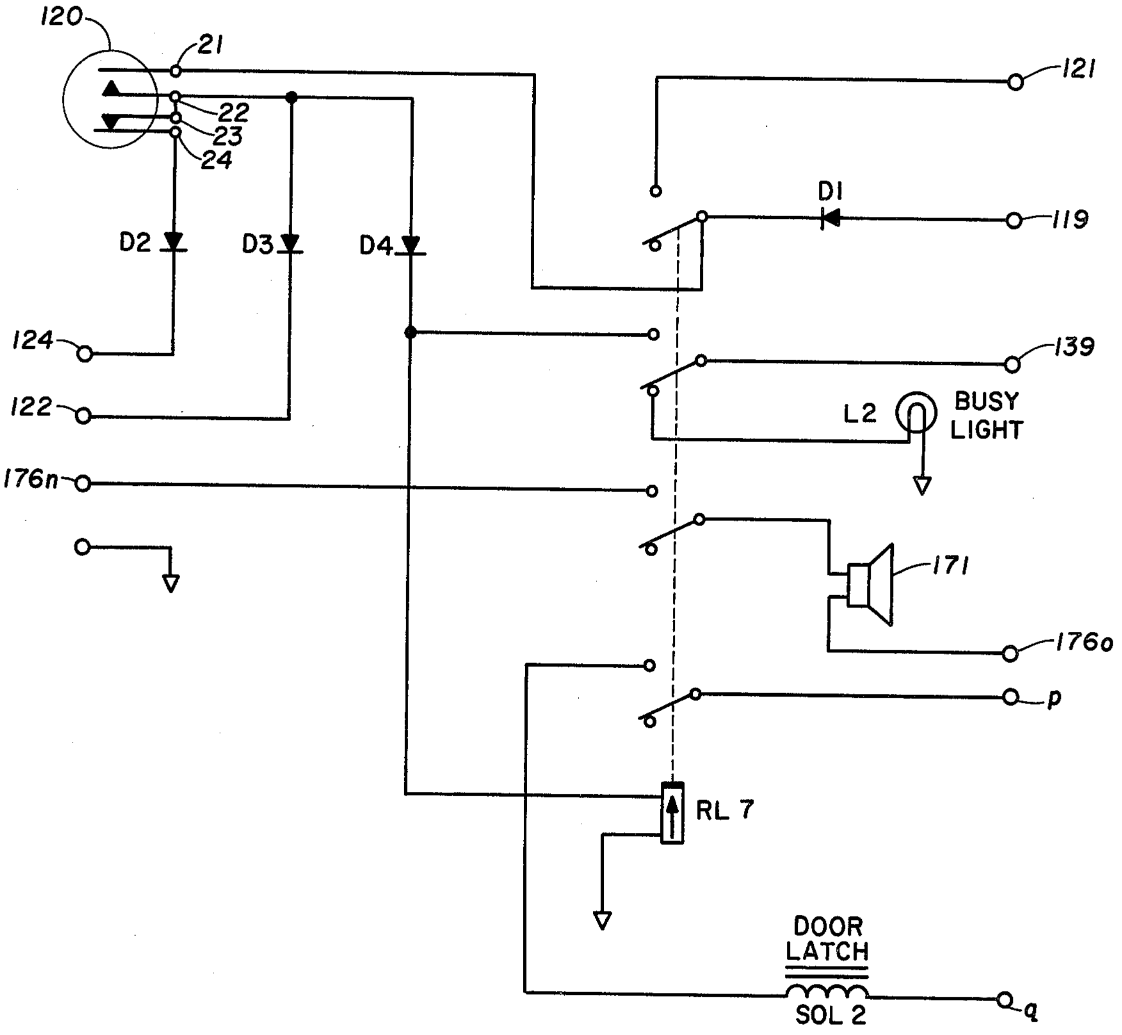
FIG. 2 is an electric schematic diagram of a circuit modifying the circuits in FIGS. 1*a* and 1*b* when used in multiple entrances.

Reference is now made to FIG. 2 in which there is shown a modified dialing unit which would be located in each of the entrances or vestibules in case there was more than one entry. The reference numerals generally have 100 added to the same reference numeral and point of electrical contact as found on FIGS. 1*a* and 1*b*. With this understanding, once dial switch 120 is rotated in a clockwise direction as previously described, 24 volts dc is applied to connection 119 which is connected to contact 19 on relay RL3. Power is then applied through a diode D1 to contact 21 of dial switch 120. The previously described electrical signals are then conducted from dial switch 120 through 3 other diodes, D2, D3, and D4 which are connected respectively to contacts 124, and 122. Connection 124 will energize relay RL1, connection 122 will energize relay RL2, and connection through diode D4 will energize relay RL7. Upon energizing relays RL2 and RL7, the relay contacts are closed applying the 24 volt signal from section L of selector stepping switch SSS to terminal 121 and grounding the 20 second delay input through resistor 30 leading to circuit 28. Relay RL3 is then energized and the contacts of the relay are closed switching the 24 volt on contact arm 35 to contact 39 and applying it to contact 139 (FIG. 2). By applying the 24 volt signal to contact 139, relay RL7 is latched in an energized position. The dial switch sequence is then completed in the manner described previously, until all digits are dialed and selector stepping switch SSS has reached position 3 where there is no voltage appearing on the switch arms 50 through 53 and in the multiple entry units, lamp L1 would not be connected but a lamp L2 (FIG. 2) would be in use, and this would be described shortly. With relay RL3 energized, the 24 volts will remain applied to connection 139 and thus keep relay RL7 held in its energized position until the 20 second delay circuit 28 permits relay RL3 to become de-energized.

With two entries or more, once dial switch 120 is rotated in one location, the 24 volt dc is removed from contact 119, thus removing the voltage from the other entries so that the other relays designated RL7 cannot be electrically energized or latched. Lamp L2 is de-energized in the entry being used and because the other relays RL7 are not latched in the other entries, the voltage applied to terminal 139 causes the other lights to indicate that the system is being used in another location. It will also be observed that the function of the input speaker 171 is also controlled by relay RL7 once it is energized and the appropriate connections made at terminals 176*n* and 176*o*. Another door latch for the particular entry of the system found in FIG. 2 is controlled through a solenoid SOL 2 which is connected in place of solenoid SOL 1 at terminals *p* and *q*, through the circuit being completed the series connected contacts on relay RL7. Thus the door latch is also de-energized at the other locations when using a particular entry. The remaining functions of returning the stepping switches to their home position is then completed in the normal manner as previously described.

Figures 5, 6, 7, 8:
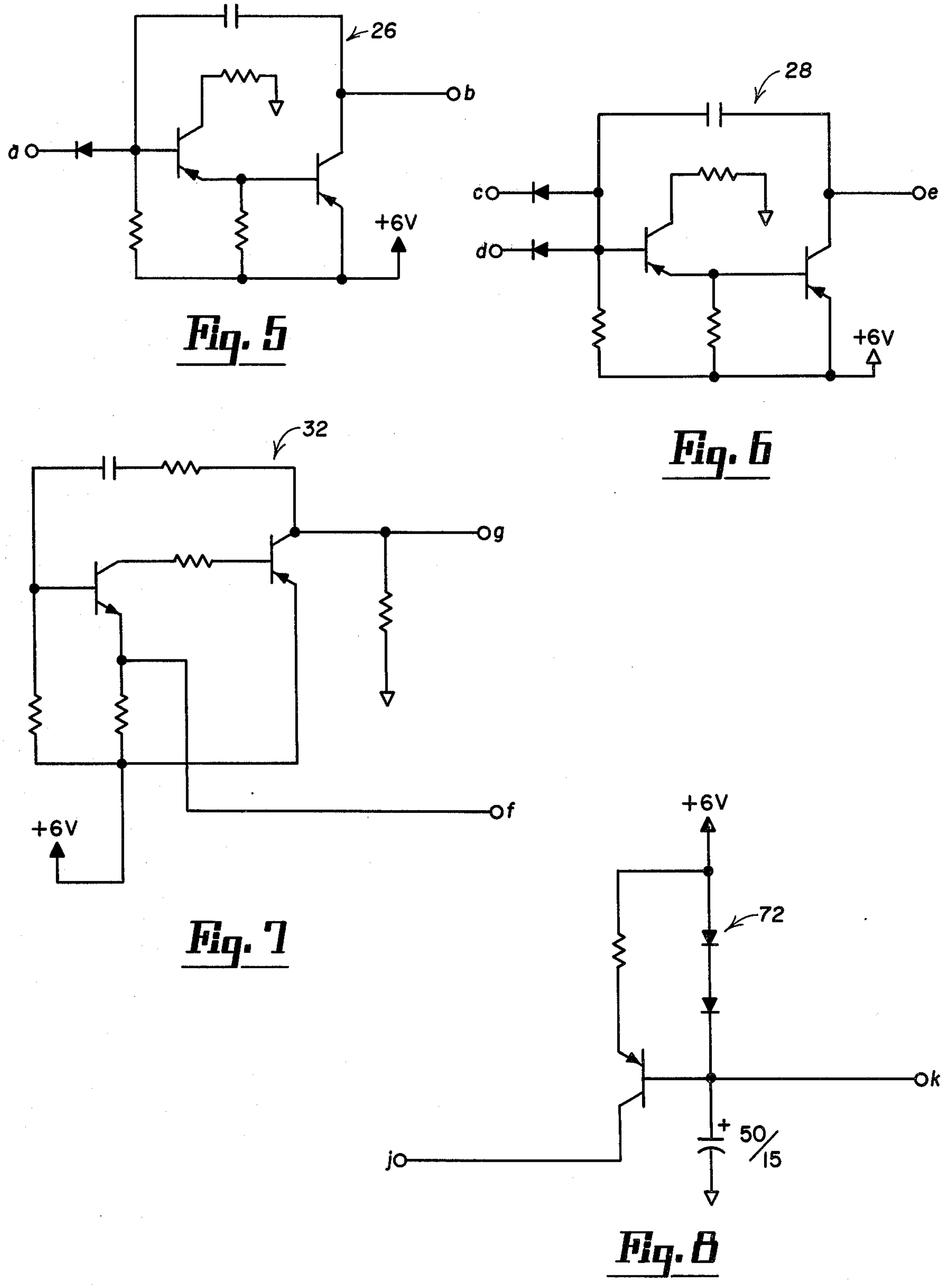
FIG. 5 is a schematic diagram of a delay circuit having a period of approximately 5 seconds.
FIG. 6 is a schematic diagram of another delay circuit having a period of approximately 20 seconds.
FIG. 7 is a schematic diagram of an audio tone circuit.
FIG. 8 is a schematic diagram of a control circuit actuating an electrically controlled door latch.

FIG. 5 discloses a 5 second delay circuit in which the input and output terminals are labeled *a* and *b* and are connected to corresponding terminals *a* and *b* of the circuit in FIG. 1*a*. FIG. 6 is the 20 second delay circuit 28 and operates in a similar manner to that of FIG. 5 with a longer RC network time constant and is connected to terminals *c*, *d*, and *e*, as found in FIG. 1*a*.

The audio tone circuit 32 is shown in FIG. 7 which generates an audio signal which is applied to the circuit through terminals *f* and *g* and are connected to the appropriate terminals in FIG. 1*a*.

Control circuit 72, as found in FIG. 8, is operated as an electronic switch for actuating relays RL4 and RL5, as described previously, and are connected to the control circuit in FIG. 1*a* at connections *j* and *k*.

Figure 3:
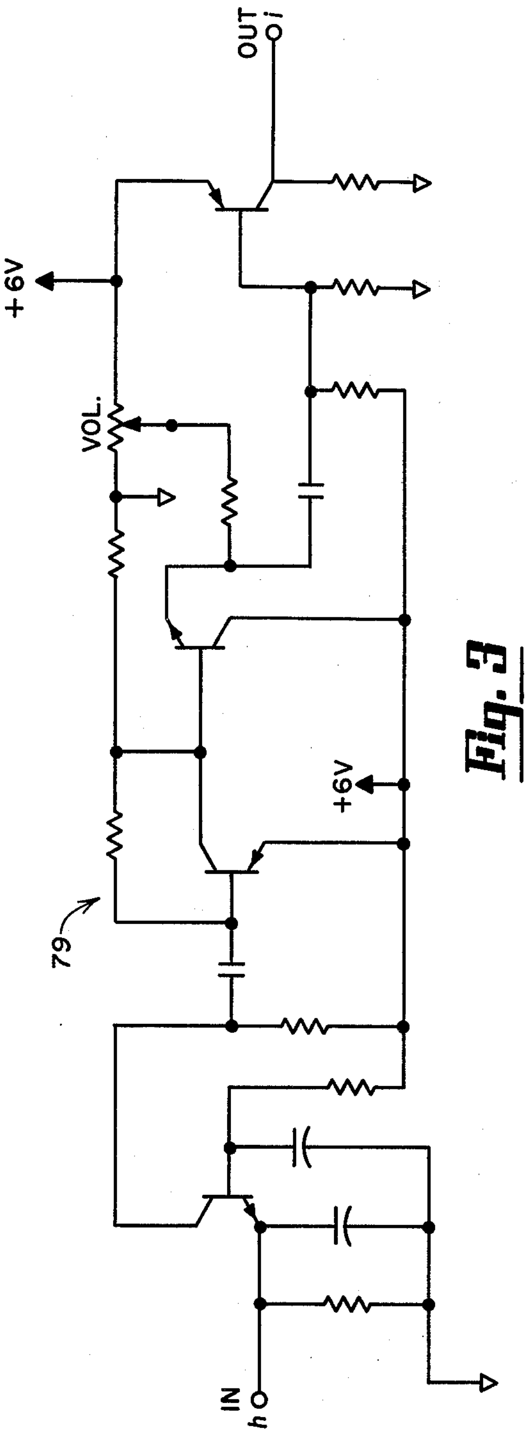
FIG. 3 is a schematic diagram of an amplifier circuit used in the invention.

Audio amplifier circuit 79 is shown in FIG. 3 and has an input connection between ground and terminal *h* and an output connection between ground and terminal *i* which are also designated by like designations on FIG. 1*a*.

It will also be observed that the relays have a diode connected across their coils to prevent the voltage spike that is created upon collapse of the magnetic field in the coils and thus spurious signals are removed from the circuit. In a similar manner, diodes D1 through D4 are used in FIG. 2 to eliminate the possibility of cross talk or parallel operation between multiple entry units.

It will thus be observed from the disclosure herein that a new intercommunication system has been provided making use of stepping switches to provide the desirable features required in an intercommunication system and door opening unit.

It will, of course, be understood that various changes may be made in the form, details, arrangement and proportions of the parts without departing from the scope of the invention which consists of the matter shown and described herein and set forth in the appended claims.

What is claimed is:

1. An intercommunication security system comprising:

a. electrical power means;

b. selectably energizable switch means connected to said electrical power means producing a series of one or more electrical pulses representative of the digits 0 through 9 each time said selectably energizable switch means is energized;

c. selector stepping switch means connected to said selectably energizable switch means for electrically directing said series of pulses representative of the digits 0 through 9 through contacts in successive order, including means for advancement thereof to a next contact after receiving the last of each of said series of pulses;

d. first stepping switch means connected to said selector stepping switch means and having a switch arm responding to a first series of said pulses;

e. second stepping switch means connected to said first stepping switch means and having a switch arm responding to a second series of said pulses;

f. third stepping switch means connected to said first stepping switch means and having a switch arm responsive to a third series of said pulses;

g. central intercommunication means connected to said first stepping switch means;

h. and a plurality of remote intercommunication means located at remote locations, each of which is connected to said second and third stepping switch means.

2. The structure set forth in claim 1 including: signal means connected to said first stepping switch means producing a calling signal in one of said remote intercommunication means after said switch arm of said second and third stepping switches represent a position corresponding to said series of digits produced by said selectable energizable switch means.

3. The structure as set forth in claim 2 including: first delay means interconnected between said signal means and said first stepping switch means eliminating said calling signal after a first predetermined period of time.

4. The structure set forth in claim 2 including: door latch control means including a door latch connected to said first stepping switch and controlling the condition of said door latch;

and door switch means located in each of said remote intercommunications means and operably connected to said second and third stepping switch means for determining the condition of said door latch.

5. The structure set forth in claim 4 including: second delay means interconnected between said selector stepping switch means and said door latch control means switching off said control means after a second predetermined period of time.

6. The structure as set forth in claim 5 including: homing means connected to each of said selector, first, second, and third stepping switch means and to said second delay means, said homing means being actuated upon lapse of said second predetermined period of time or operation of said door switch means, whichever occurs first.

7. The structure set forth in claim 6 including: indicator means connected to said selector stepping switch means at the next position beyond the last of the total number of said series of pulses received by said selector stepping switch, said indicator means providing an indication of when a different series of pulses may be produced by said selectably energizable switch means.

8. The structure set forth in claim 1 including: reversing switch means having a switch located in each of said remote intercommunication means and operably connected to said central intercommunication means and said second and third stepping switch means, said reversing switch means permitting transmitting or receiving of communication signals between said central intercommunication means and said plurality of remote intercommunication means.

9. The structure set forth in claim 1 including: a plurality of selectably energizable switch means; and relay means having a plurality of switchable circuits interconnecting said plurality of selectably energizable switch means and said first mentioned selectably energizable switch means.

10. The structure set forth in claim 9 including: circuit disabling means connected between all of said selectably energizable switch means and said relay means rendering inoperative all but the one selectably energizable switch means being operated;

and disabling indicator means connected to said relay means indicating the condition of all of said selectably energizable switch means.

* * * * *